United States Patent
Nakajima et al.

(10) Patent No.: US 7,374,343 B2
(45) Date of Patent: May 20, 2008

(54) MAGNETIC ENCODER AND WHEEL SUPPORT BEARING ASSEMBLY USING THE SAME

(75) Inventors: Tatsuo Nakajima, Iwata (JP); Kouya Oohira, Iwata (JP); Arito Matsui, Iwata (JP); Kazutoyo Murakami, Iwata (JP)

(73) Assignee: NTN Corporation, Osaka (JP)

( * ) Notice: Subject to any disclaimer, the term of this patent is extended or adjusted under 35 U.S.C. 154(b) by 586 days.

(21) Appl. No.: 10/780,609

(22) Filed: Feb. 19, 2004

(65) Prior Publication Data

US 2004/0165799 A1 Aug. 26, 2004

(30) Foreign Application Priority Data

Feb. 25, 2003 (JP) ............................. 2003-047530

(51) Int. Cl.
*F16C 33/04* (2006.01)
*G01P 3/487* (2006.01)

(52) U.S. Cl. ...................... 384/448; 384/544; 335/207; 324/174

(58) Field of Classification Search ............... 384/448, 384/544; 148/101; 335/207; 324/174
See application file for complete search history.

(56) References Cited

U.S. PATENT DOCUMENTS

| | | | |
|---|---|---|---|
| 5,302,893 A | | 4/1994 | Yoshimura |
| 6,235,129 B1 * | | 5/2001 | Kojima et al. ............... 148/302 |
| 6,692,153 B2 * | | 2/2004 | Ohtsuki et al. ............. 384/448 |
| 6,692,582 B1 * | | 2/2004 | Kojima et al. ............... 148/101 |
| 6,879,149 B2 | | 4/2005 | Okada et al. |
| 2002/0126926 A1 | | 9/2002 | Ohtsuki et al. |

FOREIGN PATENT DOCUMENTS

| | | |
|---|---|---|
| CN | 1375407 A | 10/2002 |
| EP | 0 473 950 A1 | 3/1992 |
| JP | 63-115008 | 5/1988 |
| JP | 63-300910 | 12/1988 |
| JP | 04-113222 | 4/1992 |
| JP | 11-101607 | 4/1999 |
| JP | 2001-271101 | 2/2001 |
| JP | 2002-228675 | 8/2002 |
| JP | 2004-37441 | 2/2004 |

OTHER PUBLICATIONS

Mizuta Hideo, Patent Abstracts of Japan, "Bearing Seal Having Rotation Detection Device", Publication No. 05-238369, Publication Date: Sep. 17, 1993.

Hajzler Christian, Patent Abstracts of Japan, "Sealing Structure Incorporating Encoder", Publication No. 06-281018, Publication Date: Oct. 17, 1994.

* cited by examiner

Primary Examiner—William C. Joyce

(57) ABSTRACT

To provide a magnetic encoder which can be assembled having a thin-walled structure while securing an excellent detection sensitivity and which can provide an excellent moldability by suitably selecting materials, the magnetic encoder is provided which includes a multi-pole magnet 14 having a plurality of opposite magnetic poles alternating in a direction circumferentially thereof, and a core metal 11 for supporting the multi-pole magnet. The multi-pole magnet 14 contains a powdery magnetic material mixed in an amount within the range of 20 to 90 vol. % relative to the total volume of the multi-pole magnet 14. The multi-pole magnet 14 may be a sintered magnet.

11 Claims, 7 Drawing Sheets

MAGNETIC ENCODER AND WHEEL SUPPORT BEARING ASSEMBLY USING THE SAME

BACKGROUND OF THE INVENTION

1. Field of the Invention

The present invention relates to a magnetic encoder for use with a rotation detecting device for detecting the number of revolutions of one of bearing components rotatable relative to each other and also to a wheel support bearing assembly utilizing such magnetic encoder. The magnetic encoder to which the present invention pertains is suitably incorporated in the rotation detecting device of a kind utilized in association with an automobile anti-skid brake system for detecting the number of revolutions of at least one of front and rear wheels of an automotive vehicle.

2. Description of the Prior Art

The rotation detecting device for use in association with the anti-skid brake system for minimizing the hazard of an automotive vehicle being skidded on a road surface has hitherto been assembled in a number of structures. In general, however, the conventional rotation detecting device of the kind referred to above includes a serrated rotor and a detecting sensor, which are arranged spaced a distance from a sealing device used to seal the bearing assembly, functionally integrated together to define a single and independent rotation detecting device.

This conventional rotation detecting device is of a structure in which the number of revolutions of the serrated rotor mounted on a rotary shaft for rotation together therewith can be detected by the revolution detecting sensor fitted to a knuckle. The bearing assembly incorporating such rotation detecting device is protected by the sealing device, disposed independently and laterally of the rotation detecting device, from an undesirable ingress of foreign matters such as dusts and dirt and/or water.

By way of example, the Japanese Patent No. 2816783 discloses a bearing seal assembly incorporating therein a rotation detecting device, which is so designed as to contribute to reduction of the space for mounting of the rotation detecting device and to striking improvement of the detecting performance thereof. According to this patent, the bearing seal assembly includes an annular slinger and an elastic member admixed with a powdery magnetic material and bonded by vulcanization to the annular slinger, with a plurality of opposite magnetic poles defined so as to alternate circumferentially of the elastic member.

The Japanese Laid-open Patent Publication No. 6-281018 discloses a built-in coder sealing structure so designed as to reduce the axial dimension of the sealing structure, to increase the sealability between a rotating element and a stationary element and to render it to be easily mounted. According to this patent publication, a gap between the rotating element and the stationary element is sealed with a rotary disc mounted on the rotating element for rotation together therewith. A multi-pole coder is mounted on the rotary disc and built in the sealing structure. The multi-pole coder used therein is made of an elastomer added with a powdery magnetic material.

When it comes to improvement in magnetic characteristic, the larger the amount of the powdery magnetic material container in the magnetic encoder, the better the magnetic characteristic. The use of the large amount of the powdery magnetic material allows the magnetic force, generated per unit area, to be advantageously increased and the magnetic encoder can therefore be fabricated in a thin-walled structure with promising increase of the detection sensitivity. In particular, the use of the powder of rare earth magnetic material, rather than the use of the powder of ferrite magnetic material, is effective to increase the magnetic characteristic.

However, where the matrix is an elastomer or a plastomer, the amount of the powdery rare earth magnetic material to be blended cannot be increased because of the following problems found occurring during a process of mixing the matrix with the powdery rare earth magnetic material. Problems similar to those with the use of the powdery rare earth magnetic material equally apply to that of the powdery ferrite magnetic material.

(a) If the amount of the powdery magnetic material to be blended is large, a processing machine (particularly a kneading machine) is apt to be damaged considerably. The running torque tends to be so large as to impose an excessive load on the processing machine and/or, as a result of contact with the powdery magnetic material that is generally hard and tough, rolls used in the processing machine are susceptible to wear, accompanied by considerable damage.

(b) By the effect of heat evolved during the processing (blending and kneading), the powdery magnetic material is susceptible to oxidization, resulting in eventual degradation of the magnetic characteristic.

Also, when the conventional magnetic encoder made of an elastomer or a plastomer is applied in the rotation detecting device incorporated in the wheel support bearing assembly, particulate matters such as sand particles or grit tend to be trapped in between the magnetic encoder and the sensor confronting the magnetic encoder, resulting in damage to the surface of the magnetic encoder.

In order to alleviate the above discussed problems, the applicant of the present invention has suggested, in the Japanese Laid-open Patent Publication No. 2004-037441, a magnetic encoder made of a sintered element formed by molding and sintering a powdery mixture containing a powdery magnetic material and a powdery non-magnetic material. The use of the sintered element makes it possible to increase the amount of the powdery magnetic material to be mixed and also to provide a thin-walled structure, along with increase of the resistance to wear. Also, with the magnetic encoder made of the sintered element, mixing and blending of powdery materials with each other, that is, dry blend is possible. In the case of the dry blend, the problems (a) and (b) discussed above can be remarkably alleviated.

However, it has been found that even in the magnetic encoder made of the sintered element, molding would be impossible if the amount of the powdery magnetic material is too large.

SUMMARY OF THE INVENTION

In view of the foregoing, the present invention is intended to provide a magnetic encoder which can be assembled having a thin-walled structure while securing an excellent detection sensitivity and which can provide an excellent moldability by suitably selecting materials.

Another important object of the present invention is to increase the durability and the productivity.

A further object of the present invention is to provide a wheel support bearing assembly capable of performing a rotation detection with no need to increase the number of component parts and with a compact structure and which is provided with the magnetic encoder excellent in durability for the rotation detection.

In order to accomplish these objects of the present invention, there is provided a magnetic encoder of a kind including a multi-pole magnet having a plurality of opposite magnetic poles alternating in a direction circumferentially thereof, and a core metal for supporting the multi-pole magnet. The multi-pole magnet contains a powdery magnetic material mixed in an amount within the range of 20 to 90 vol. %, preferably 30 to 80 vol. %, relative to the total volume of the multi-pole magnet and also containing a powdery non-magnetic material as the remainder.

The multi-pole magnet referred to above may be, for example, of an annular configuration or a disc-shaped configuration. Similarly, the core metal may be, for example, of an annular configuration or a disc-shaped configuration.

The magnetic encoder of the above described structure is disposed with the multi-pole magnet held in face-to-face relation with a magnetic sensor and is used for detecting the number of revolutions. When this magnetic encoder is rotated, passage of a plurality of opposite magnetic poles of the multi-pole magnet can be detected by the magnetic sensor which provides a train of pulses indicative of the number of revolutions. Since the multi-pole magnet contains the powdery magnetic material mixed in an amount within the range of 20 to 90 vol. % relative to the total volume of the multi-pole magnet, not only can a thin-walled structure be attained along with an excellent detection sensitivity, but also the moldability can be secured by suitably selecting materials.

If the amount of the powdery magnetic material contained in the multi-pole magnet is smaller than the lowermost limit of 20 vol. %, the residual magnetic flux density will be low and the multi-pole magnet will not be fabricated having a thin-walled structure. The use of the powdery magnetic material in an amount greater than this lowermost limit is effective to secure the magnetic force required to accomplish a stabilized detection even though the multi-pole magnet is fabricated having a thin-walled structure. On the other hand, if the amount of the powdery magnetic material contained in the multi-pole magnet is greater than the uppermost limit of 90 vol. %, molding would be impossible or, if not impossible, difficult to achieve even where the sintered element is prepared, but if it is not greater than the uppermost limit, moldability can be secured.

The powdery magnetic material may be a powder of ferrite. The ferrite powder is inexpensive as compared with other powdery magnetic materials and the use thereof makes it possible to manufacture the magnetic encoder inexpensively. The ferrite powder may be either a granulated ferrite powder or a wet powder of anisotropic ferrite core. Where the wet powder of anisotropic ferrite core is used, the multi-pole magnet is preferably prepared from a sintered element in which a powdery mixture of the powdery magnetic and non-magnetic materials is sintered. In such case, it is necessary to prepare a green compact formed from the powdery mixture with the powdery non-magnetic metallic material in a magnetic field. The wet powder of anisotropic ferrite core can be used to form a magnetic powder of a high orientation and a high strength and can leads to a thin-walled sintered element and, therefore, where the multi-pole magnet is shaped into a ring, the ring-shaped sintered element of a more thin-walled structure and having a large diameter can be obtained.

The powdery magnetic material may be a powdery rare earth magnetic material. By way of example, the powdery magnetic material may be a magnetic powder of the samarium compound or a magnetic powder of the neodymium compound. The use of the magnetic powder of the samarium compound or of the neodymium compound is effective to secure a strong magnetic force. For the samarium magnetic powder, a powder of samarium iron nitrogen compound (SmFeN) can be used and, for the neodymium magnetic powder, a powder of neodymium iron boron compound (NdFeB) can be used. Also, other than those specific magnetic powders, a gas atomized powder of manganese aluminum (MnAl) may be employed as the powdery magnetic material.

In the practice of the present invention, the multi-pole magnet may be prepared from a sintered element made of a powdery mixture of the powdery magnetic and non-magnetic metallic materials. Where the multi-pole magnet is so prepared, the following advantages can be obtained:

(1) As compared with the elastomer or plastomer hitherto employed, the ratio of the powdery magnetic material to be mixed can be increased and, therefore, the magnetic force available per unit volume can be increased. Accordingly, the detection sensitivity can be increased and the thin-walled structure can be attained.

(2) As compared with the conventional sintered magnet in which only a powdery magnetic material is sintered, cracking will hardly occur because of the presence of the powdery non-magnetic metallic material which serves as a binder.

(3) Since the surface is hard as compared with the conventional elastomer or the like, not only can an excellent resistance to wear be obtained, but also breakage will occur hardly.

(4) As compared with the conventional elastomer, the productivity is high.

The powdery non-magnetic metallic material may be a powder of stainless steel or tin. Where the powdery magnetic material is a powder of ferrite, the powdery non-magnetic metallic material may be a powder of stainless steel or a powder of tin. On the other hand, where the powdery magnetic material is a powder of the samarium compound, a powder of stainless steel or a powder of tin can be used as the powdery non-magnetic metallic material. Where the powdery magnetic material is a powder of the neodymium compound, a powder of stainless steel or a powder of tin can also be used as the powdery non-magnetic metallic material.

As compared with the other non-magnetic metallic powders, the stainless steel powder is excellent in rust proofing property and the sintered element prepared by the use of it can provide an excellent rust proofing property.

Where the powdery non-magnetic metallic material is employed in the form of a powder of tin, tin has a melting point of 232° C. which is low for a metallic material, and can readily available as an engineering material and is relatively inexpensive. While lead (Pb), cadmium (Cd) and the like can be enumerated as a metal of a low melting point, the use of any of those materials as an engineering material is problematic because of its influence on the natural environment. Also, the use of zinc is also problematic since it has a melting point of 432° C., which is higher than that of tin, and because, if it is sintered with the magnetic powder of the samarium compound, it will affect the magnetic characteristic of the magnetic powder and/or it will induce a considerable change in size before and after the sintering step of the sintered element. In addition, the combined use of the magnetic powder of the samarium compound and the non-magnetic metallic powder of tin will result in particle shape of the magnetic powder and the tin powder that is particularly advantageous in formation of a green compact as compared with the other magnetic powder of the neodymium compound.

Where the multi-pole magnet is prepared from the sintered element formed by sintering the powdery mixture of the powdery magnetic material and the powdery non-magnetic metallic material, the powdery mixture may include two or more powdery magnetic materials or two or more powdery non-magnetic metallic material. The powdery mixture referred to above may contain two or more powdery magnetic materials and two or more powdery non-magnetic metallic materials. The use of the two or more powdery magnetic materials or the two or more powdery metallic materials is effective in that a desired characteristic can be secured if a plurality of arbitrarily chosen powders are mixed together.

In the practice of the present invention, the powdery magnetic material referred to above may contain two or more magnetic powders. Even where the multi-pole magnet is of a kind prepared by mixing an elastomer or plastomer with the magnetic powder and where the multi-pole magnet is prepared from the sintered element referred to above, the powdery magnetic material may contain two or more magnetic powders.

Where the two or more magnetic powders are contained in the powdery magnetic material, the desired characteristic can be obtained by mixing a plurality of arbitrarily chosen powders. By way of example, where the sole use of the ferrite powder does not result in a sufficient magnetic force, a required amount of the powder of the samarium compound and/or the powder of the neodymium compound, both of which is a rare earth magnetic material, may be mixed with the ferrite powder so that the multi-pole magnet can be manufactured inexpensively while securing an increased magnetic force.

The present invention also provides a wheel support bearing assembly equipped with the magnetic encoder of any one of the foregoing structures. Since the magnetic encoder according to the present invention can provide a magnetic force required to achieve a stabilized sensing and can be manufactured having a thin-walled structure, the use of such magnetic encoder in the wheel support bearing assembly makes it possible to provide the wheel support bearing assembly of a compact structure and reliable in accomplishing the detection of rotation.

In particular, where the multi-pole magnet is prepared from the sintered element formed by sintering the powdery mixture of the powdery magnetic material and the powdery non-magnetic metallic material, the following advantages can be obtained:

The wheel support bearing assembly in general is, when in use, exposed to severe environments on a road surface and it may occur very often that particulate matters such as sand particles are trapped in between the magnetic encoder and the magnetic sensor disposed in fact-to-face relation therewith. However, according to the present invention, the following protection is available against the possible entanglement of the particulate matters. Specifically, the surface hardness of the multi-pole magnet employed in the form of the sintered element prepared from the powdery magnetic material and the powdery non-magnetic metallic material is higher than that exhibited by the conventional coder made of an elastomer or plastomer containing powdery magnetic material and magnetic particles. Because of this, even if in the wheel support bearing assembly equipped with the magnetic encoder for the detection of the number of revolutions of a vehicle wheel, particulate matters such as sand particles are trapped in between the surface of the multi-pole magnet on a rotating side and the surface of the magnetic sensor on a stationary side during run of an automotive vehicle, wear of and damage to the surface of the magnetic encoder can advantageously be reduced considerably.

The wheel support bearing assembly of the present invention may be of a structure wherein the magnetic encoder forms a part of a sealing unit for sealing an annular bearing space. By way of example, the wheel support bearing assembly may be for supporting a wheel for rotation relative to a vehicle body and may include an outer member having an inner peripheral surface formed with a plurality of first raceways, an inner member having a corresponding number of second raceways defined therein in alignment with the first raceways in the outer member, rows of rolling elements rollingly received in part within the first raceways and in part within the second raceways, and a sealing unit for sealing an annular bearing space delimited between the outer member and the inner member.

In this wheel support bearing assembly, the sealing unit includes a first sealing plate of a generally L-sectioned configuration mounted on one of the outer and inner members which serves as a rotatable member, and a second sealing plate of a generally L-sectioned configuration mounted on the other of the outer and inner members which serves as a stationary member, and positioned in face-to-face relation with the first sealing plate. The first sealing plate defines the core metal of the magnetic encoder and having a cylindrical axial wall and a radial upright wall. An elastic sealing member including a side sealing lip and at least one radial sealing lip, said elastic sealing member is secured to the second sealing plate with the side sealing lip slidingly engaging the radial upright wall of the first sealing plate and with the at least one radial sealing lip slidingly engaging the cylindrical axial wall. The multi-pole magnet referred to above is mounted on the radial upright wall of the first sealing plate.

In this construction of the wheel support bearing assembly, since the magnetic encoder forms a component part of the sealing unit, the number of revolutions of the vehicle wheel can be detected with a compact structure and with no need to increase the number of component parts. Also, an excellent sealing effect can be obtained because the side sealing lip and the radial sealing lip of the elastic sealing member secured to the second sealing plate are slidingly engaged with the first sealing plate.

Where the multi-pole magnet of the magnetic encoder is prepared from the sintered element comprised of the powdery magnetic material and the powdery non-magnetic metallic material, the following advantages can be obtained. More specifically, where the magnetic encoder is formed in the sealing unit, a problem would arise in that sand particles or the like are apt to be trapped in between the magnetic encoder and the magnetic sensor when exposed to a severe environment on the road surface. However, in view of the surface hardness of the multi-pole magnet is high for the possible trap of the sand particles, an effect of reducing the wear and damage can be obtained.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
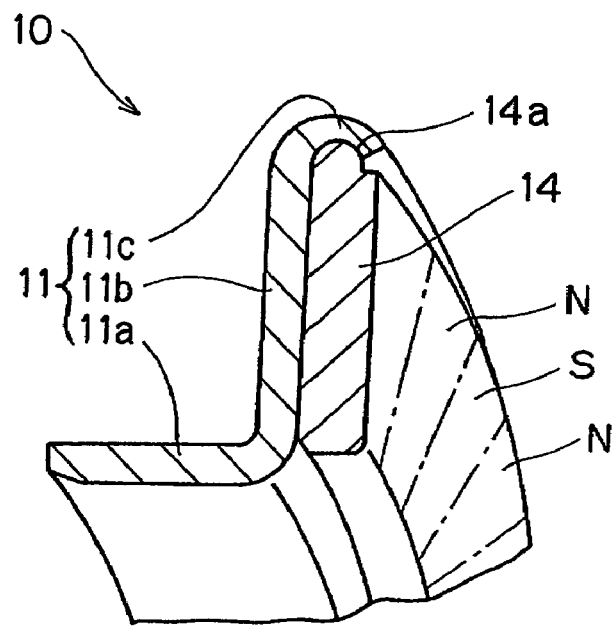
FIG. 1A is a fragmentary perspective view showing a portion of a magnetic encoder according to a first preferred embodiment of the present invention.

Referring first to FIGS. 1A to 3, there is shown a magnetic encoder 10 according to a first preferred embodiment of the present invention. The magnetic encoder 10 shown therein includes an annular core metal 11 made of a metallic material and an annular multi-pole magnet 14 secured to an annular surface of the core metal 11 so as to extend circumferentially thereof. The multi-pole magnet 14 is a member having a plurality of opposite magnetic poles N and S magnetized so as to alternate in a direction circumferentially thereof and may be in the form of a magnetic ring. The opposite magnetic poles N and S alternate circumferentially of the multi-pole magnet 14 at intervals of a predetermined pitch p as measured along the pitch circle diameter (PCD) shown in FIG. 2. The magnetic encoder 10 of the structure described above is fitted to a rotating member (not shown) and cooperates with a magnetic sensor 15 disposed in face-to-face relation with the multi-pole magnet 14 to detect the number of revolutions of the rotating member that rotates together with a vehicle wheel (not shown). As such, the magnetic encoder 10 and the magnetic sensor 15 altogether constitute a rotation detecting device 20.

Figure 1B:
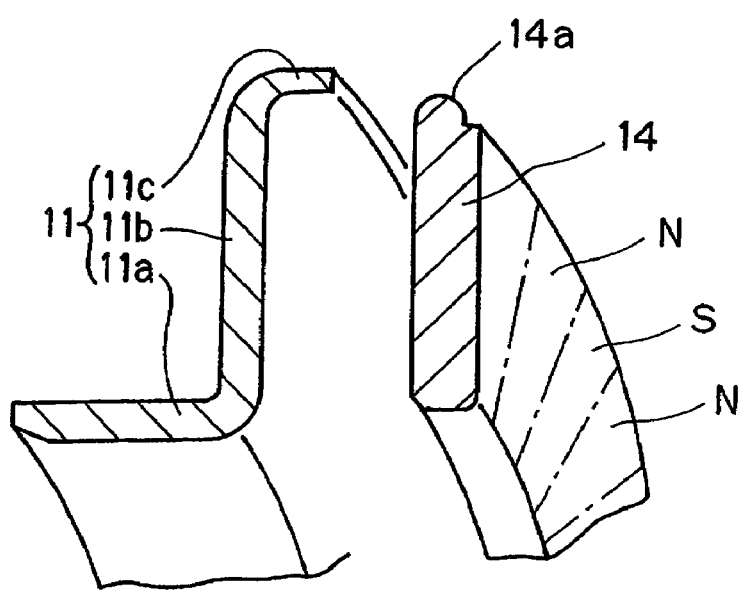
FIG. 1B is a fragmentary perspective view of that portion of the magnetic encoder of FIG. 1A, showing the manner of assemblage of the magnetic encoder.
Figure 2:
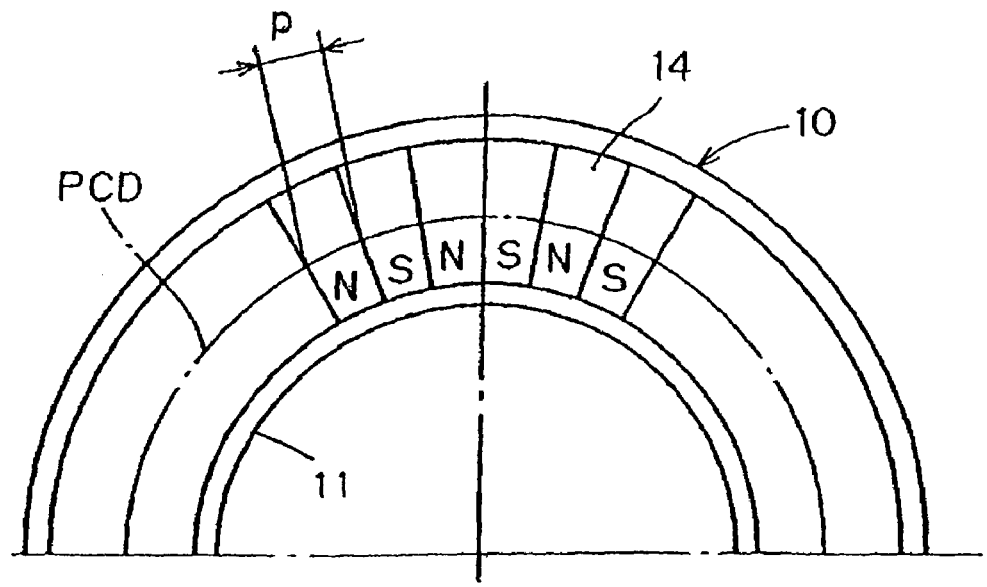
FIG. 2 is an explanatory diagram showing an upper portion of the magnetic encoder as viewed from front.
Figure 3:
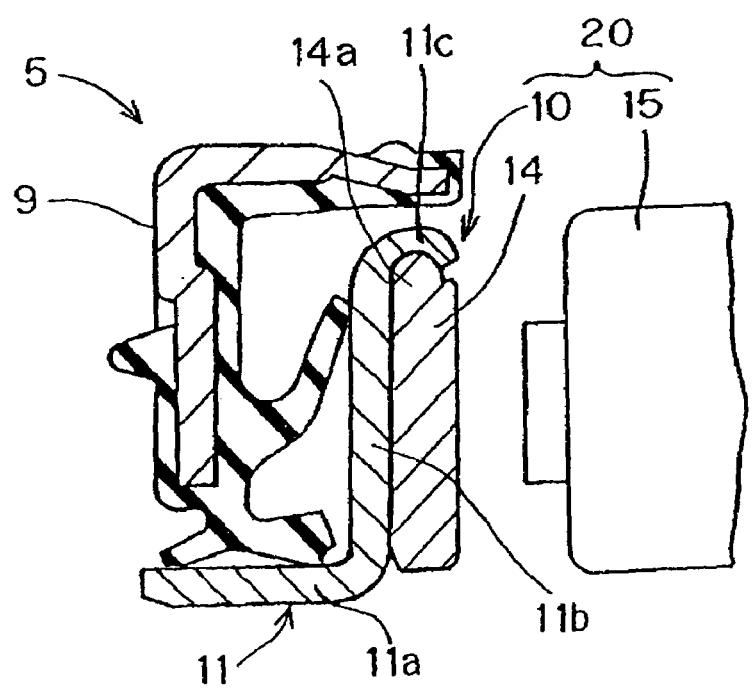
FIG. 3 is a fragmentary sectional view, showing a sealing unit incorporating the magnetic encoder therein and a magnetic sensor.
Figure 4:
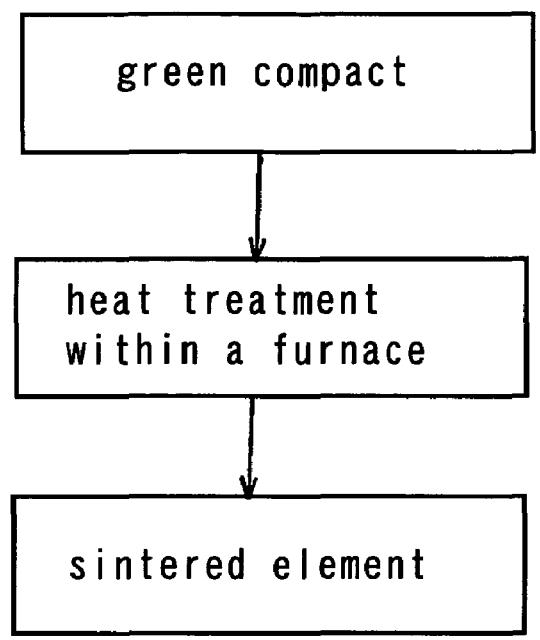
FIG. 4 is a flowchart showing the manner of manufacture of a sintered element from a green compact.

In the embodiment shown in FIGS. 1 to 3, the magnetic encoder 10 is shown as constituting one of component parts of a sealing unit 5 with the magnetic encoder 10 secured to one of mating raceway members of a bearing assembly which is rotatable relative to the other of the raceway members. In addition to the magnetic encoder 10, the sealing unit 5 also includes a stationary sealing member 9. The details of the sealing unit 5 will be described later.

The multi-pole magnet 14 is made of a mixture of powdery magnetic and non-magnetic materials. The powdery magnetic material contained in the multi-pole magnet 14 may be a powder of isotropic or anisotropic ferrite of, for example, the barium or strontium compound. The ferrite powder may be either a granulated ferrite powder or a wet powder of anisotropic ferrite core. Where the wet powder of anisotropic ferrite core is used as the powdery magnetic material, it is necessary to prepare a green compact formed from a powdery mixture with the powdery non-magnetic metallic material in a magnetic field.

The powdery magnetic material may be a powdery rare earth magnetic material. By way of example, the rare earth magnetic material includes samarium iron nitrogen compound (SmFeN) and neodymium iron boron compound (NdFeB) and the powdery rare earth magnetic material that can be employed in the practice of the present invention may be either a powder of the samarium iron nitrogen compound or a powder of neodymium iron boron compound. Also, a gas atomized powder of manganese aluminum (MnAl) may be employed as the powdery magnetic material.

Also, the powdery magnetic material employed in the practice of the present invention may be a mixture of two or more of the powdery samarium iron nitrogen compound (SmFeN), the powdery neodymium iron boron compound (NdFeB) and the gas atomized powder of manganese aluminum (MrAl). By way of example, the powdery magnetic material referred to above may be a mixture of the powdery samarium iron nitrogen compound (SmFeN) and the powdery neodymium iron boron compound (NdFeB); a mixture of the gas atomized powder of manganese aluminum and the powdery samarium iron nitrogen compound; or a mixture of the powdery samarium iron nitrogen compound, the powdery neodymium iron boron compound and the gas atomized powder of manganese aluminum.

Yet, where the sole use of the powdery ferrite material appears to result in an insufficient magnetic force, the powdery ferrite material may be mixed with a required amount of the magnetic powder of the samarium iron nitrogen compound that is a rare earth magnetic material or the magnetic powder of the neodymium iron boron compound so that, while being manufactured inexpensively, the magnetic force can be increased.

The powdery non-magnetic metallic material forming another component of the multi-pole magnet 14 may be a powder of one or a mixture of two or more of tin, copper, aluminum, nickel, zinc, tungsten, manganese and non-magnetic stainless steel, or an alloyed powder of two or more of them.

Preferably, the powdery magnetic material and the powdery non-magnetic metallic material both contained in the multi-pole magnet 14 have an average particle size not smaller than 10 μm and not greater than 150 μm and, preferably, not smaller than 20 μm and not greater than 130 μm. If one or both of the powdery magnetic material and the powdery non-magnetic metallic material has or have an average particle size smaller than 10 μm, the powdery mixture will hardly flow into the mold assembly when the green compact is to be prepared at room temperature, and no green compact of a predetermined shape cannot be obtained. On the other hand, if one or both of the powdery magnetic material and the powdery non-magnetic metallic material has or have an average particle size greater than 150 μm, the green compact will not have a sufficient strength and, therefore, the green compact cannot be molded as it cannot be separated from the mold assembly.

The powdery magnetic and non-magnetic materials of the respective particle sizes discussed above are mixed together in a predetermined mixing ratio by the use of a mixing machine and the resultant mixture is press-molded at room temperature within a mold assembly to provide the green compact.

In the mixture used to eventually form the multi-pole magnet 14, the amount of the powdery magnetic material employed is chosen to be within the range of 20 to 90 vol. % and, preferably, 30 to 80 vol. % relative to the total volume of the multi-pole magnet 14. If the amount of the powdery magnetic material contained in the multi-pole magnet 14 is smaller than the lowermost limit of 20 vol. %, the residual magnetic flux density will be low and the multi-pole magnet 14 will not be fabricated having a thin-walled structure. The use of the powdery magnetic material in an amount greater than this lowermost limit is effective to secure the magnetic force required to accomplish a stabilized detection even though the multi-pole magnet 14 is fabricated having a thin-walled structure. On the other hand, if the amount of the powdery magnetic material contained in the multi-pole magnet 14 is greater than the uppermost limit of 90 vol. %, molding would be impossible or, if not impossible, difficult to achieve, but if it is not greater than the uppermost limit, moldability can be secured.

In preparing the green compact, a lubricant such as, for example, zinc stearate or the like may be added, when the powdery magnetic and non-magnetic materials are mixed together, to thereby improve the moldability of the green compact.

The green compact that can be used as a material for the multi-pole magnet 14 has a porosity within the range of 5 to 30 vol. %, preferably 12 to 22 vol. % and, more preferably 14 to 19 vol. %. If the porosity of the green compact is lower than the lowermost limit of 5 vol. %, the possibility would arise that the green compact being prepared will rupture by the effect of the spring back which, when the molding pressure is relieved, would occur upon recovery from elastic deformation of the mixture of the powdery magnetic and non-magnetic materials. On the other hand, if the porosity of the green compact is higher than the uppermost limit of 30 vol. %, the sintered element which is subsequently prepared from the green compact will exhibit an insufficient mechanical strength and, therefore, as will be detailed later, the sintered element will break when the sintered element is to be fixed to the core metal 11 by the use of a crimping or press-fitting technique. Also, the excessive porosity exceeding the uppermost limit will also result in insufficient bonding between particles and the green compact may therefore not be prepared sufficiently.

Considering that the powdery magnetic material and the powdery non-magnetic metallic material both used in the practice of the present invention are expensive, the green compact preferably has a relatively small plate thickness. Specifically, the plate thickness of the green compact is preferably within the range of 0.3 to 5 mm and, more preferably, 0.6 to 3 mm. If the plate thickness is smaller than the lowermost limit of 0.3 mm, not only would it be difficult to fill the mixture of the powdery magnetic and non-magnetic material into the mold assembly and the green compact would not be easily obtained, but the green compact if successfully obtained will be susceptible to breakage during handling. On the other hand, if the green compact has a plate thickness greater than the uppermost limit of 5 mm, a disadvantage would arise in terms of cost even though the moldability and the handling capability increase. In addition, the excessive plate thickness exceeding the uppermost limit tends to render the resultant green compact to have an uneven density to such an extent that when the green compact is subsequently sintered, the resultant sintered element is susceptible to deformation. By the reasons discussed above, the green compact preferably has a plate thickness within the range of 0.3 to 5 mm.

The green compact so obtained is sintered within a furnace to provide a sintered element of a ring or disc shape. The heat treatment to sinter the green compact within the furnace is carried out under the atmosphere, in an electric heating furnace or a vacuum furnace, or in an inert furnace or pusher furnace with an inert gas flowing thereinto.

Figure 5:
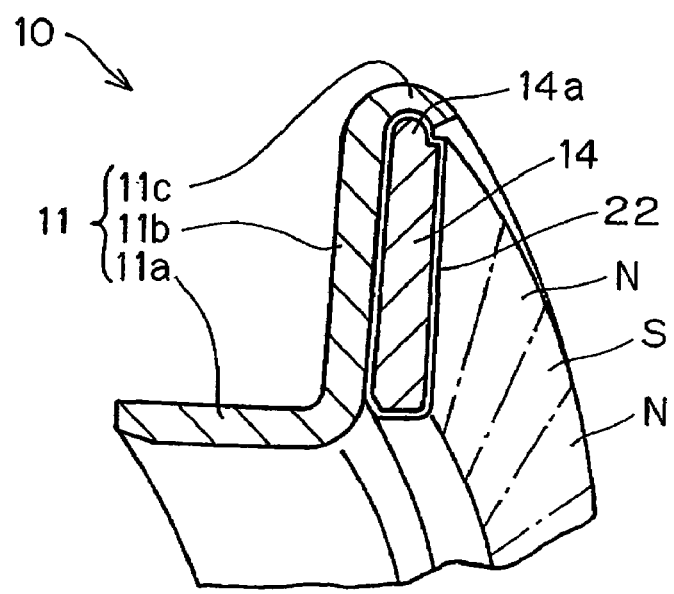
FIG. 5 is a fragmentary perspective view showing that portion of the magnetic encoder according to a second preferred embodiment of the present invention.

The sintered element used to form the magnetic encoder 10 may have treated to have a rust preventive coating 22, as shown in FIG. 5, for preventing it from rusting. This rust preventive coating 22 is, in other words, an anti-corrosion coating and may be formed by the use of a high rust-proofing clear paint. The clear paint referred to above can be expected to bring about an effect as a bonding agent for bonding the core metal and the sintered element together and, when penetrating into pores in a porous surface region of the sintered element, the clear paint can be appropriately retained in the surface portion by the anchoring effect of a component of the clear paint and, therefore, a favorable bondability as the rust preventive coating can be maintained even during the use for a prolonged period of time.

A metallic material that can be used to form the core metal 11 is preferably a ferromagnetic material and, for example, a steel plate having a magnetic property and a rust preventive property can be suitably employed therefor. Examples of such steel plate include a stainless steel plate of a ferrite type (SUS 430 or the like according to the JIS Standard), a rolled steel plate treated to have a rust resistant property and so on.

The core metal 11 is of any suitable annular configuration and preferably has a shape capable of permitting the multi-pole magnet element 14 to be fixed thereto. In particular, the core metal 11 preferably has such a shape that the multi-pole magnet element 14 can be mechanically fixed thereto by means of crimping or fitting.

Where the core metal 11 is fixed in position by the use of a crimping technique, the core metal 11 is of a generally L-sectioned annular configuration including the cylindrical axial wall 11a on a radially inward side serving as a mounting side and a radial upright wall 11b extending radially outwardly from one end of the axial wall 11a, as shown in FIG. 1B. In the embodiment so far shown, the radial upright wall 11b has an outer peripheral edge formed integrally with an annular flange 11c lying at an angles thereto and, therefore, the core metal 11 including the annular flange 11c may represent a generally Z-sectioned configuration.

The core metal 11 of the above described configuration including the cylindrical axial wall 11a, the radial upright wall 11b and the annular flange 11c can readily be formed from a metallic plate such as a steel plate or the like by the use of any known press work. The radial upright wall 11b is of an annular flat shape and the sintered element, which has not yet been magnetized and will eventually form the multi-pole magnet 14, is held flat against one of the opposite surfaces of the radial upright wall 11b, with the annular flange 11c subsequently curled inwardly to crimp an outer peripheral portion of the sintered element to thereby firmly fix the multi-pole magnet 14 to the core metal 11.

Thus, the annular flange 11c in its entirety or a free peripheral edge portion of the annular flange 11c remote from the radial upright wall 11b of the core metal 11 defines a crimping portion. Also, this crimping portion extends over the entire circumference of the core metal 11 and, accordingly, represents an annular shape. That outer peripheral portion of the multi-pole magnet 14 that is crimped by the annular flange 11c serving as the crimping portion is depressed inwardly as an inwardly depressed outer peripheral portion 14a from the remaining surface of the multi-pole magnet 14 that defines a to-be-detected surface. Accordingly, with the multi-pole magnet 14 secured to the core metal 14 in the manner described above, the annular flange 11c of the core metal 11 serving as the crimping portion does not protrude outwardly beyond and is held substantially in flush with the to-be-detected surface of the core metal 11.

The inwardly depressed outer peripheral portion 14a of the multi-pole magnet 14 defined a step somewhat set backwardly from the to-be-detected surface of the multi-pole magnet 14. A rear side of the inwardly depressed outer peripheral portion 14a of the multi-pole magnet 14 is so shaped as to represent an annular rounded surface and the annular flange 11c defining the crimping portion is correspondingly so shaped as to follow the curvature of the annular rounded surface of the multi-pole magnet 14. While the crimping of the annular flange 11c is carried out so as to crimp the outer peripheral portion of the multi-pole magnet 14 over the entire circumference thereof as discussed above, an alternative is possible in which crimping of the outer peripheral portion of the multi-pole magnet 14 is carried out at a plurality of locations over the circumference thereof.

Figure 6:
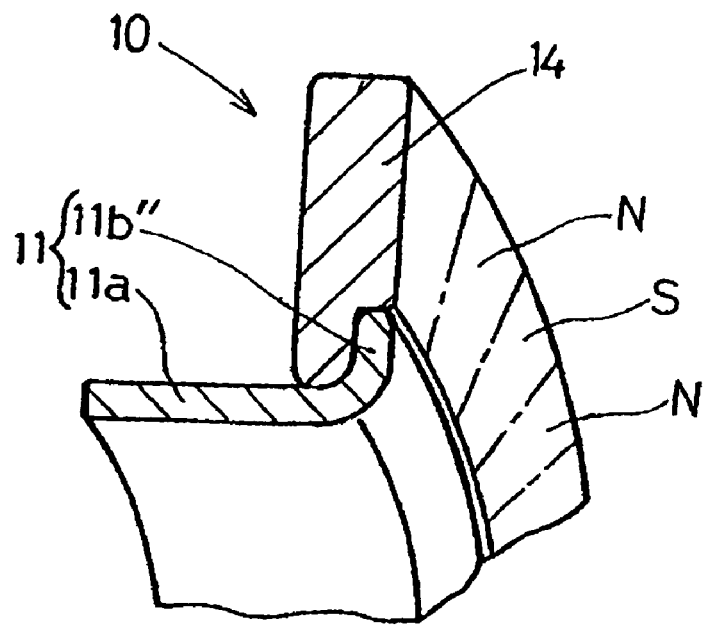
FIG. 6 is a fragmentary perspective view showing that portion of the magnetic encoder according to a third preferred embodiment of the present invention.

Alternatively, the core metal 11 may include a cylindrical axial wall 11a and an annular upright wall 11b" protruding a small distance radially outwardly from one end of the cylindrical axial wall 11a, to thereby render the core metal 11 to represent a generally L-sectioned configuration as shown in FIG. 6. Even this core metal 11 shown in FIG. 6 can readily be formed from a metallic plate such as a steel plate or the like by the use of any known press work. The annular upright wall 11b" is formed flat and the ring-shaped sintered element that eventually forms the multi-pole magnet 14 is fixed in position having been press-fitted onto the outer peripheral surface of the cylindrical axial wall 11a until it is brought into contact with the flat radial upright wall 11b" The distance over which the flat upright wall 11b" extends radially outwardly from that end of the cylindrical axial wall 11a is smaller than the distance over which the flat upright wall 11b shown in FIG. 1 in connection with the foregoing embodiment extends radially outwardly from that end of the cylindrical axial wall 11a.

Figure 7:
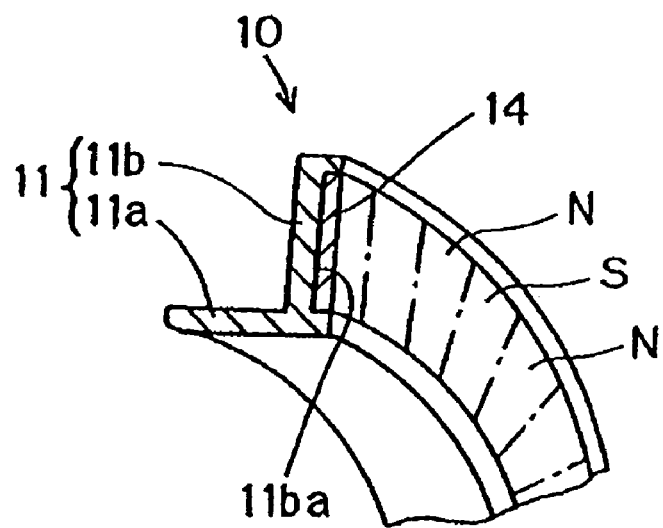
FIG. 7 is a fragmentary perspective view showing that portion of the magnetic encoder according to a fourth preferred embodiment of the present invention.

Although in any of the foregoing embodiments the core metal 11 has been described as prepared from a metallic plate such as a steel plate by the use of any known press work, the core metal 11 that can be employed in the practice of the present invention can be prepared by machining or grinding a steel material as shown in FIG. 7. In the embodiment shown in FIG. 7, the core metal 11 has a groove 11ba defined in the radial upright wall 11b by the use of machining (cutting) technique.

The ring-shaped sintered element, which is prepared by sintering the mixture of the powdery magnetic and non-magnetic materials, is fitted circumferentially to the core metal 11 which is an annular metallic member and will define the multi-pole magnet 14 when magnetized circumferentially. As hereinbefore described, this multi-pole magnet 14 cooperates with the core metal 11 to define the magnetic encoder 10.

The magnetic encoder 10 of the structure hereinabove described, when positioned in face-to-face relation with the magnetic sensor 15, is used for detecting the number of revolutions as hereinbefore described with reference to FIG. 3. Specifically, when the magnetic encoder 10 is rotated, passage of the opposite magnetic poles of the multi-pole magnet 14 can be detected by the magnetic sensor 15 which detects the rotation in the form of a train of pulse, the number of which pulse corresponds to the number of revolutions of the magnetic encoder. Since the pitch p (FIG. 2) between the neighboring opposite poles N and S in the multi-pole magnet 14 can be defined finely. For example, if the pitch p is chosen to be 1.5 mm, the precision of ±3% of a single pitch deviation can be achieved, thus allowing the rotation detection with a high accuracy. The single pitch deviation referred to above is represented by the difference between the magnetic poles detected at the position spaced a predetermined distance from the magnetic encoder 10, which is expressed by the ratio relative to a target pitch. Where the magnetic encoder 10 is employed in the sealing unit 5 of the bearing assembly as shown in FIG. 3, the number of revolution of the bearing raceway member on which the magnetic encoder 10 is mounted can be detected.

Since the multi-pole magnet 14 contains the powdery magnetic material in an amount within the range of 20 to 90 vol. % relative to the total volume of the multi-pole magnet, the multi-pole magnet 14 can be fabricated having a thin-walled structure with high moldability and can yet provide a high detection sensitivity, that is, a magnetic force required to achieve a stabilized sensing. If the amount of the powdery magnetic material contained in the multi-pole magnet 14 is smaller than the lowermost limit, the residual magnetic flux density will be low and the multi-pole magnet 14 will not be fabricated having a thin-walled structure. Thus, the use of the powdery magnetic material in an amount greater than this lowermost limit is effective to secure the magnetic force required to accomplish a stabilized detection even though the multi-pole magnet 14 is fabricated having a thin-walled structure.

Since the multi-pole magnet 14 is prepared from the sintered element, the amount of the powdery magnetic material to be contained in the multi-pole magnet 14 can be increased to 90 vol. % relative to the total volume of the multi-pole magnet. In other words, in the case of the magnetic ring (sintered element) in which the powdery magnetic material is blended with the powdery non-magnetic metallic material used as a binder, a dry blend of constituent particles can be obtained by dispersing the powdery magnetic and non-magnetic materials within a powder mixing machine while the mixing ratio thereof are adjusted. For this reason, the relative content (volume based percent) of the powdery magnetic material contained in the sintered element can be increased. The use of the increased amount of the powdery magnetic material is effective to allow the multi-pole magnet 14 to provide an magnetic force required for the magnetic sensor 15 (FIG. 3) to achieve a stabilized sensing, with no need to render the multi-pole magnet 14 to have an increased thickness.

Where the multi-pole magnet 14 is prepared from the sintered element, the amount of the powdery magnetic material to be mixed can be increased to 90 vol. % as discussed above. However, if the amount of the powdery magnetic material contained in the multi-pole magnet 14 increases to a value greater than the uppermost limit of 90 vol. %, molding would be impossible or, if not impossible, difficult to achieve.

The multi-pole magnet 14 thus prepared from the sintered element 10 has an additional advantage in that, not only can the amount of the powdery magnetic material employed be increased as discussed above to achieve a thin-walled structure while securing a sufficient magnetic force, but also the employment of the dry blend referred to above can eliminate the need to use a kneading process such as required with elastomers and plastomers, resulting in increase in productivity. In addition, the resistance to wear can also be increased as discussed subsequently.

Specifically, the multi-pole magnet 14 prepared from the sintered element has a surface hardness higher than that exhibited by a coder made of an elastomer or a plastomer containing a powdery magnetic material or magnetic particles. Because of this, if the multi-pole magnet 14 is employed in the rotation detecting device 20 for detecting the number of revolutions of the vehicle wheel, wear and damage would hardly occur even though sand particles are trapped into a space delimited between the surface of the multi-pole magnet 14 on the rotating side and the mating surface of the magnetic sensor 15 on the stationary side during run of the automotive vehicle and, therefore, as compared with that made of the elastic material, the extent to which the wear occurs can be reduced considerably.

Hereinafter, experiments and results thereof are described. Compositions (1) to (8) listed in the following Table 1 are those that can be employed in a magnetic encoder in which the multi-pole magnet prepared from the sintered element is employed. The powdery non-magnetic metallic material shown in Table 1 is employed in the form of a powdery tin and the powdery magnetic material also shown in Table 1 is employed in the form of a powdery samarium iron nitrogen compound. Test pieces, each 25 mm in diameter and 3.2 mm in thickness and having the respective compositions as shown in Table 1, were prepared and tested as to the residual magnetic flux density, results of which are shown in Table 1. In Table 1, the moldability and the handling capability of each of the test pieces are also evaluated. The handling capability referred to above means the capability of the green compact of the powdery mixture being easily removed from the mold assembly. It is to be noted that the symbols O, Δ and X used in connection with the moldability and the handling capability in Table 1 stands for Excellent, Good and Rejected, respectively.

TABLE 1

| Composition | Powdery non-magnetic metallic material (vol. %) | Powdery Magnetic Material (vol. %) | Residue Magnetic Flux Density (mT) | Moldability | Handling Capability |
|---|---|---|---|---|---|
| (1) | 5 | 95 | — | X | X |
| (2) | 20 | 80 | 400 | O | O |
| (3) | 30 | 70 | 350 | O | O |
| (4) | 40 | 60 | 300 | O | O |
| (5) | 50 | 50 | 250 | O | O |
| (6) | 60 | 40 | 225 | O | O |
| (7) | 70 | 30 | 200 | O | O |
| (8) | 90 | 10 | 170 | O | O |

From Table 1, it is clear that the compositions (2) to (7), in which the powdery magnetic material is mixed within the range of 30 to 80 vol. %, are effective to result in excellent residue magnetic flux density, moldability and handling capability. It is to be noted that the residue magnetic flux density is evaluated excellent when it exhibits a value equal to or higher than 200 mT which is a range required for the magnetic encoder to function properly.

The composition (8) is the case in which the powdery magnetic material is mixed in a relatively small amount of 10 vol. % with the powdery non-magnetic metallic material as listed in Table 1. Although this composition (8) results in the moldability and handing capability, the residue magnetic flux density exhibited is 170 mT which is so low as to depart from the lowermost limit (200 mT) required for the magnetic encoder to function properly. On the other hand, the composition (1) is the case in which the powdery magnetic material is mixed in a relatively large amount of 90 vol. % with the powdery non-magnetic metallic material as listed in Table 1 and has proven that no molding is possible.

From the foregoing results of the experiments, where the multi-pole magnet is prepared from the sintered element, it appears that the lowermost limit of the preferred content of the powdery magnetic material in the sintered element is 20 vol. % relative to the total volume of the multi-pole magnet, which value is intermediate between 10 vol. %, at which the insufficient residual magnetic flux density would result in, and 30 vol. % at which the sufficient residue magnetic flux density would result in and that the uppermost limit of the preferred content of the powdery magnetic material in the sintered element is 90 vol. % relative to the total volume of the multi-pole magnet, which value is intermediate between 95 vol. %, at which the molding is impossible to perform, and 80 vol. % at which the molding can be performed satisfactorily.

Compositions (9) to (14) shown in the following Table 2 are used to form a rubber magnet. The powdery non-magnetic material is employed in the form of elastomers and the powdery magnetic material is employed in the form of a powdery samarium iron nitrogen compound. Using those compositions, test pieces of sintered elements, each 25 mm in diameter and 3.2 mm in thickness and having the respective compositions as shown in Table 2, were prepared and tested as to the residual magnetic flux density, results of which are shown in Table 2.

In the case of the compositions (9) to (12), since the content of the powdery magnetic material in the sintered element is too high, the rotational torque of the device tends to be high and the moldability was insufficient. In the case of the composition (14), although the residue magnetic flux density exhibited is equal to the lowermost limit required for the magnetic encoder to function properly, the moldability and the handling capability are insufficient.

TABLE 2

| Composition | Powdery non-magnetic metallic material (vol. %) | Powdery Magnetic Material (vol. %) | Residue Magnetic Flux Density (mT) | Moldability | Handling Capability |
|---|---|---|---|---|---|
| (9) | 20 | 80 | — | X | X |
| (10) | 30 | 70 | — | X | X |
| (11) | 40 | 60 | — | X | X |
| (12) | 50 | 50 | — | X | X |
| (13) | 60 | 40 | 225 | X | X |
| (14) | 70 | 30 | 200 | Δ | Δ |

In view of the foregoing, where the rubber magnet is desired, the preferred amount of the powdery magnetic material to be mixed with the powdery non-magnetic material appears to be smaller than 30 vol. %.

From the results shown respectively in Tables 1 and 2, the specific value of the residue magnetic flux density depends on the content of the powdery magnetic material in the sintered element and it therefore appears that the preferred amount of the powdery magnetic material employed in terms of the residue magnetic flux density is equal to or greater than 20 vol. % and, more preferably, equal to or greater than 30 vol. %. While the moldability and the handling capability are principally affected by difference of the powdery non-magnetic material, the powdery non-magnetic material can be chosen arbitrarily and, based on this, it appears that the amount the powdery magnetic material that can be employed is equal to or smaller than 90 vol. % and, more preferably, equal to or smaller than 80 vol. %. In view of the foregoing, the amount of the powdery magnetic material that can be employed is preferably within the range of 20 to 90 vol. % and, more preferably, within the range of 30 to 80 vol. %.

Figure 8:
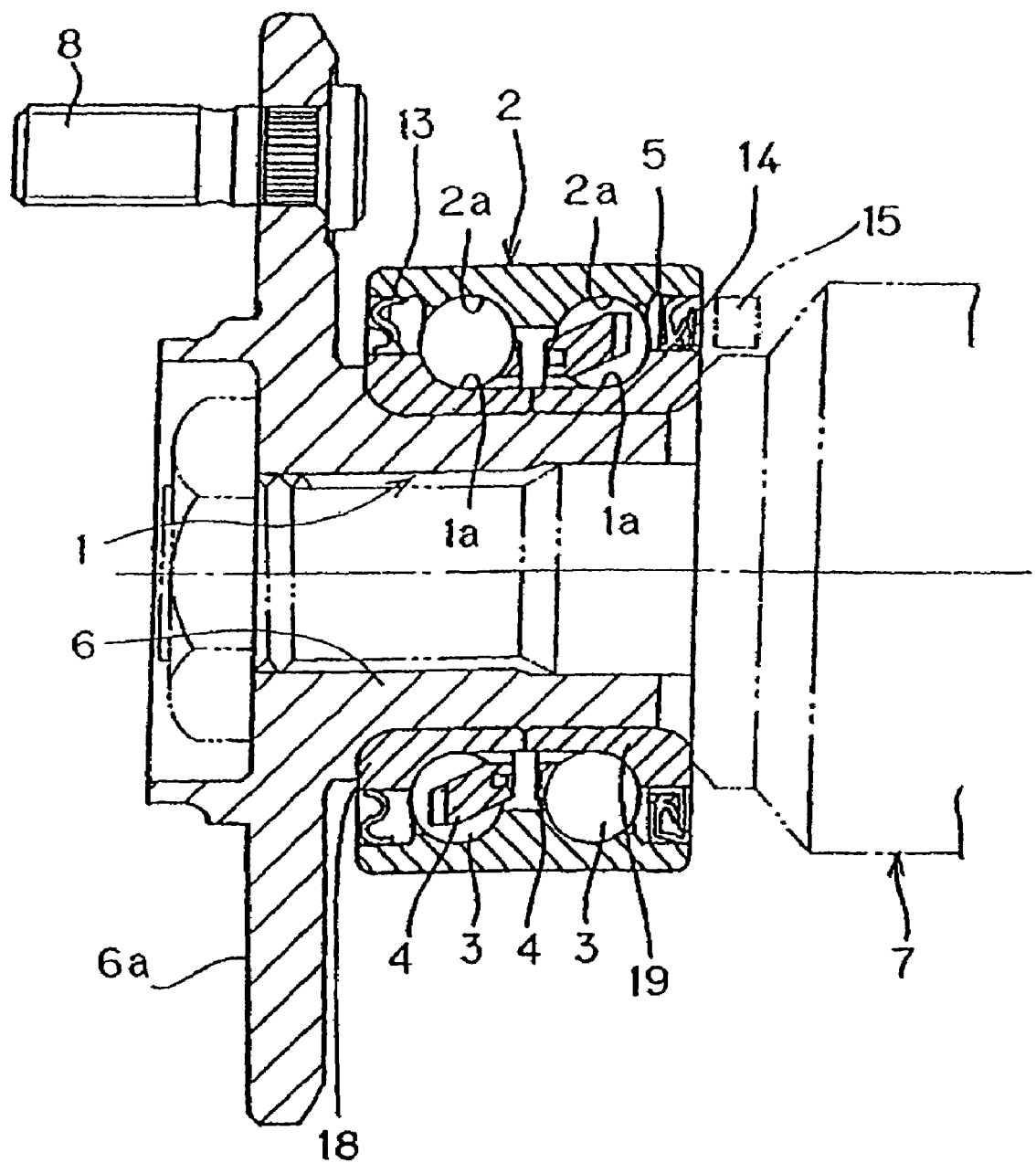
FIG. 8 is a longitudinal sectional view of a wheel support bearing assembly equipped with the magnetic encoder according to the first embodiment.

Hereinafter, an example of the wheel support bearing assembly employing the above discussed magnetic encoder 10 and an example of the sealing unit 5 will be described in detail with reference to FIGS. 8 and 9. As best shown in FIG. 8, the wheel support bearing assembly includes an inner member 1, an outer member 2 accommodating the inner member 1 therein with an annular working space delimited between it and the inner member 1, a plurality of, for example, two, rows of rolling elements 3 rollingly interposed within the annular working space between the inner and outer members 1 and 2, and sealing units 5 and 13 utilized to seal respective opposite ends of the annular working space. Of those sealing units, only the sealing unit 5 in the illustrated embodiment is provided with the magnetic encoder 10 of the structure described hereinbefore.

The inner member 1 has an outer peripheral surface formed with a circumferentially grooved raceway 1a defined therein in the form of a circumferentially extending, generally semicircular sectioned groove for each of the rows of the rolling elements 3 and, similarly, the outer member 2 has an inner peripheral surface formed with a circumferentially grooved raceway 2a defined therein in the form of a circumferentially extending, generally semicircular sectioned groove in alignment with the respective grooved raceway 1a in the inner member 1. The inner and outer members 1 and 2 represent respective members on inner and outer peripheral sides that are rotatable relative to each other through the rows of the rolling elements 3. The inner and outer members 1 and 2 may be bearing inner and outer races, respectively, or bearing inner and outer races each combined with a separate component parts. Also, the inner member 1 may be a shaft. The rows of the rolling elements may be either balls or tapered rollers, but in the illustrated embodiment the rows of balls are shown and employed.

The wheel support bearing assembly of the structure described above is, by way of example, a double row rolling bearing assembly and, more specifically, a double row angular contact ball bearing assembly and includes a bearing inner race comprised of separate inner race segments 18 and 19 having the grooved raceways 1a and 1a defined therein for the corresponding rows of the rolling elements. The inner race segments 18 and 19 are mounted on an axle portion of a hub wheel 6 and cooperate with the hub wheel 6 to define the inner member 1. It is to be noted that instead of the inner member 1 of the three component construction comprised of the hub wheel 6 and the inner race segments 18 and 19, the inner member 1 may be of a two component construction including an integral port of the hub wheel 6 and one of the inner race segments 18 and 19, that is, a hub wheel having an outer peripheral surface formed with the grooved raceway 1a, and the other of the inner race segments 18 and 19.

The hub wheel 6 is drivingly coupled with one end (for example, an outer race) of a constant velocity universal joint 7 and has a flange 6a formed integrally therewith. A vehicle wheel (not shown) is coupled with the flange 6a of the hub wheel 6 by means of a plurality of bolts 8 for rotation together therewith in a manner known to those skilled in the art. The constant velocity universal joint 7 has the opposite end, that is, an inner race drivingly coupled with a drive axle.

The outer member 2 is in the form of a bearing outer race and is connected with a housing for a wheel suspension system such as knuckle. Each row of the rolling elements 3 are rollingly retained by a cage or retainer 4 in any known manner.

Figure 9:
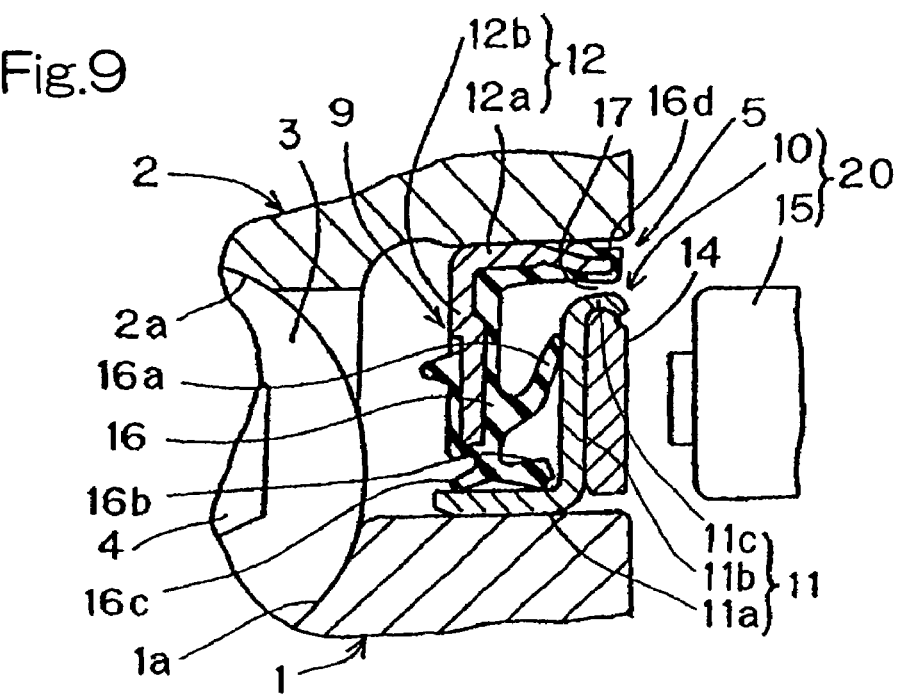
FIG. 9 is a fragmentary longitudinal sectional view, on an enlarged scale, showing a portion of the wheel support bearing assembly according to the first embodiment.

FIG. 9 illustrates, on an enlarged scale, the sealing unit 5 equipped with the magnetic encoder. The sealing unit 5 shown therein is substantially identical with that shown in FIG. 3. While the sealing unit 5 has been briefly described, the details thereof will now be described with particular reference to FIG. 9.

Referring to FIG. 9, the sealing unit 5 includes a slinger defined by the magnetic encoder 10 or the core metal 11 and is mounted on one of the inner and outer members 1 and 2 which is rotatable relative to the other thereof. In the illustrated embodiment, since the inner member 1 is rotatable while the outer member 2 is stationary, the magnetic encoder 10 is press-fitted onto the outer peripheral surface of the inner member 1.

The sealing unit 5 includes first and second annular sealing plates (11) and 12 made of a metallic material and mounted respectively on the inner and outer members 1 and 2. The first sealing plate (11) corresponds to the core metal 11 of the magnetic encoder 10 shown in and described with reference to FIG. 3 and, therefore, reference will be hereinafter made to the core metal 11, rather than to the first sealing plate (11). The magnetic encoder 10 is of the structure shown in and described with reference to FIGS. 1 to 3 in connection with the first embodiment and, therefore, the description thereof which has been made with reference to FIGS. 1 to 3 will not be reiterated for the sake of brevity. When the magnetic sensor 15 is disposed in face-to-face relation with the multi-pole magnet 14 of the magnetic encoder 10 as shown, the rotation detecting device 20 for detecting the number of revolutions of the vehicle wheel is completed. In other words, the magnetic sensor 15 in combination with the multi-pole magnet 14 constitutes the rotation detecting device 20.

The second sealing plate 12 corresponds to the sealing member 9 shown in FIG. 3 and includes an elastic sealing element 16 formed integrally with an elastic side sealing lip 16a, slidingly engageable with an inner surface of the radial upright wall 11b of the core metal 11, which is the first sealing plate, and elastic radial sealing lips 16b and 16c slidingly engageable with the cylindrical axial wall 11a. The elastic sealing element 16 is bonded by vulcanization to the second sealing plate 12 with the side sealing lip 16a and the radial sealing lips 16b and 16c held in sliding contact with the radial upright wall 11b and the cylindrical axial wall 11a, respectively. Although the number of the sealing lips that can be employed in the elastic sealing element 16 may be chosen as desired, the example shown in FIG. 9 makes use of the single side sealing lip 16a and the two radial sealing lips 16b and 16c spaced a distance from each other in a direction axially of the bearing assembly.

The second sealing plate 12 includes the elastic sealing element 16 firmly retained at a mounting portion with the outer member 2 which serves as the stationary member. In other words, the elastic sealing element 16 has a back-turned tongue 16d extending from a portion of an inner peripheral surface of the cylindrical axial wall 12a to a portion of an outer peripheral surface of the cylindrical axial wall 12a while covering a free end face of the cylindrical axial wall 12a, which tongue 16d is sandwiched in the mounting portion between the second sealing plate 12 and the outer member 2 to thereby increase the sealability at that mounting portion.

The cylindrical axial wall 12a of he second sealing plate 12 and the annular flange 11c of the core metal 11 which is the first sealing plate are spaced a slight distance from each other to define a labyrinth seal 17 within a gap so defined therebetween.

With the wheel support bearing assembly so constructed as hereinabove described, rotation of the inner member 1 together with the vehicle wheel can be detected by the magnetic sensor 15 then cooperating with the magnetic encoder 10 mounted on the inner member 1. Accordingly, the magnetic sensor 15 can provide an electric output signal indicative of the number of revolutions of the vehicle wheel.

Since in the embodiment described above the magnetic encoder 10 forms a component part of the sealing unit 5, the rotation of the vehicle wheel can be detected with no need to increase the number of component parts employed. Considering that the wheel support bearing assembly in general is, when in use, exposed to severe environments on a road surface and it may occur very often that particulate matters such as sand particles are trapped in between the magnetic encoder 10 and the magnetic sensor 15 disposed in fact-to-face relation therewith, wear of and damage to the surface of the magnetic encoder 10 can advantageously be reduced considerably as compared with the conventional multi-pole magnet made of the elastic material as hereinbefore discussed, because the multi-pole magnet 14 of the magnetic encoder 10 is prepared from the sintered element and is therefore hard. Also, while the space available at a bearing end of the wheel support bearing assembly 5 is limited to a narrow space because of the presence of the constant velocity universal joint 7 and a bearing support member (not shown) in the neighborhood, the rotation detecting device 20 can be easily installed because the multi-pole magnet 14 of the magnetic encoder 10 can be manufactured having a thin-walled structure.

The sealing between the inner and outer members 1 and 2 can be achieved by the sliding engagement achieved by the sealing lips 16a to 16c, provided on the second sealing plate 12, and the labyrinth seal 17 defined in a slight gap delimited between the cylindrical axial wall 12a of the second sealing plate 12 and the flange 11c of the core metal 11 spaced a slight distance radially from the cylindrical axial wall 12a.

In the wheel support bearing assembly shown in FIGS. 8 and 9, the core metal 11 of the magnetic encoder 10 has been described substantially identical with that shown in FIG. 1. It is, however, to be noted that the magnetic encoder 10 of the structure shown in and described with reference to FIGS. 5 to 7 can be equally employed.

Also, where the magnetic encoder 10 is so designed as to be a component part of the sealing unit 5 for the bearing assembly, the multi-pole magnet 14 may be arranged oriented inwardly relative to the bearing assembly in a manner substantially reverse to that in any one of the previously described embodiments. In other words, the multi-pole magnet 14 may be provided on one surface of the core metal 11 confronting inwardly of the bearing assembly. In such case, the core metal 11 is preferably made of a non-magnetic material.

Figure 10:
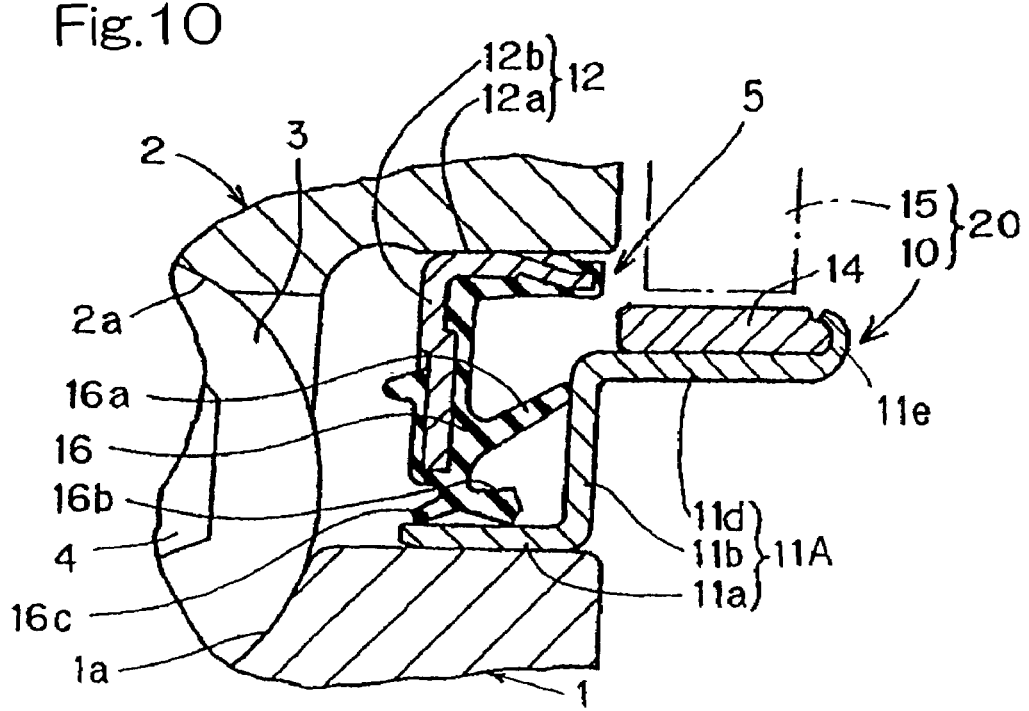
FIG. 10 is a fragmentary longitudinal sectional view, on an enlarged scale, showing that portion of the wheel support bearing assembly according to another preferred embodiment of the present invention.

Although in any one of the foregoing embodiments the multi-pole magnet 14 has been shown and described as oriented axially, the multi-pole magnet 14 may alternatively be oriented radially as shown in FIG. 10. Specifically, in the embodiment shown in FIG. 10, the core metal 11a, which is the sealing plate that serves as the slinger of the sealing unit 5, is provided with a second cylindrical axial wall 11d extending axially outwardly from the radial upright wall 11b thereof, with the multi-pole magnet 12 fixedly mounted on an outer peripheral surface of the second cylindrical axial wall 11d. In other words, the second cylindrical axial wall 11d has an annular free end formed with a radially outwardly extending crimping flange 11e that is curled substantially backwardly to crimp the multi-pole magnet 14 to thereby secure the latter on the outer peripheral surface of the second cylindrical axial wall 11d. The radial upright wall 11b extends radially outwardly from the cylindrical axial wall 11a. That is, the core metal 11a employed in the embodiment shown in FIG. 10 represents a generally Z-sectioned configuration including the cylindrical axial wall 11a, the radial upright wall 11b and the second cylindrical axial wall 11d, with the crimping flange 11e formed integrally with the annular free end of the second cylindrical axial wall 11d so as to extend radially outwardly. The magnetic sensor 15 cooperative with the magnetic encoder is disposed radially outwardly around the multi-pole magnet 14 in face-to-face relation therewith.

Although in any one of the foregoing embodiments of the present invention, the multi-pole magnet 14 of the magnetic encoder 10 has been described as prepared from the sintered element, the present invention can be equally applied even where the multi-pole magnet is in the form of a rubber magnet or a plastics magnet, that is, a magnet made by mixing the powdery magnetic material with the powdery non-magnetic material, i.e., a powder of elastomer or plastomer, used as a matrix.

Also, in describing the magnetic encoder 10 used in any one of the foregoing embodiments, it has been described as a component part of the sealing unit 5 of the wheel support bearing assembly. However, the magnetic encoder 10 may not be a component part of the sealing unit 5 and the magnetic encoder 10 by itself can be employed for the rotation detection. By way of example, the magnetic encoder 10 shown and described as employed in the first embodiment of FIG. 1 may be provided on the bearing assembly separate from and independently of the sealing unit 5.

Figure 11:
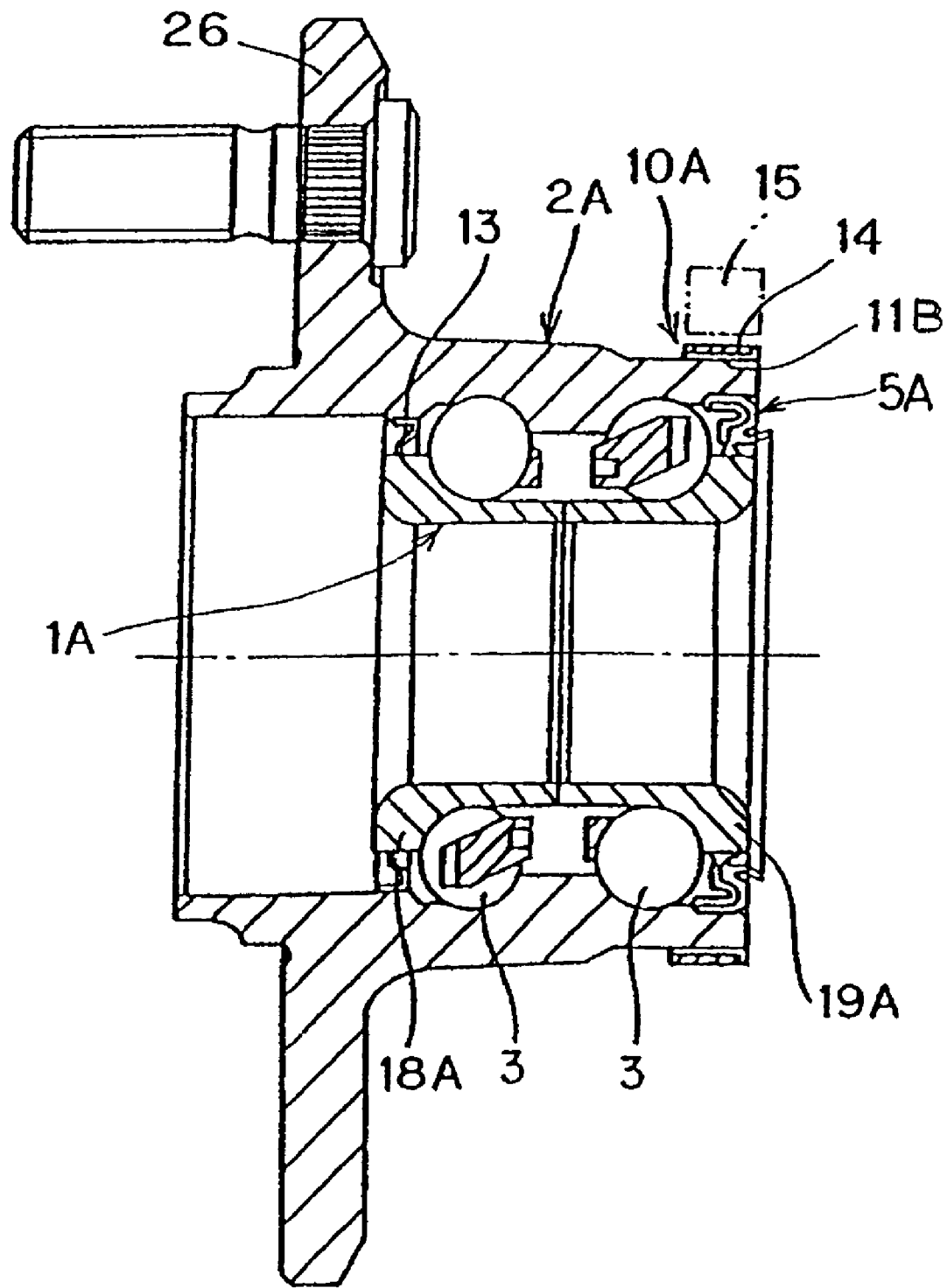
FIG. 11 is a longitudinal sectional view of the wheel support bearing assembly according to a further preferred embodiment of the present invention.

As shown in FIG. 11, the magnetic encoder 11A may be of a structure in which the multi-pole magnet 14 is mounted on the outer peripheral surface of the cylindrical core metal 11C so as to confront in a direction radially outwardly. In such case, the magnetic encoder 10 may be mounted on an outer peripheral surface of an outer member 2A in the wheel support bearing assembly. The wheel support bearing assembly shown in FIG. 11 is of a structure wherein of the inner and outer members 1A and 2A the outer member 2A is a rotatable member relative to the inner member 1A with a wheel mounting flange 26 formed in the outer member 2A. The sealing unit 5A employed therein is mounted on the bearing assembly separate from the magnetic encoder 10A. The inner member 1A is comprised of axially aligned inner race segments 18A and 19A.

From the foregoing detailed description of the present invention, it is clear that in the magnetic encoder including the multi-pole magnet having the circumferentially alternating opposite magnetic poles and the core metal for supporting the multi-pole magnet, the powdery magnetic material forming one of the constituent elements of the multi-pole magnet is mixed in an amount of 20 to 90 vol. % relative to the total volume of the multi-pole magnet and, therefore. Accordingly, the multi-pole magnet having a thin-walled structure can be manufactured with an excellent detection sensitivity and a high moldability can be secured by suitably selecting materials therefor.

In particular, where the multi-pole magnet is prepared from the sintered element, the multi-pole magnet can exhibit an excellent resistance to wear and, even during the manufacture of the multi-pole magnet that serves as a coder portion, a molding load is relatively small and, therefore, the number of steps of the manufacturing process can be considerably reduced.

It is also clear that the wheel support bearing assembly of the present invention is effective to achieve a rotation detection with a compact structure.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A magnetic encoder comprising:
a ring shaped multi-pole magnet having a plurality of opposite magnetic poles alternating in a direction circumferentially thereof; and
a core metal to which the multi-pole magnet is fixed by crimping,
said multi-pole magnet containing a powdery magnetic material mixed in an amount within the range of 20 to 90 vol. % relative to the total volume of the multi-pole magnet,
said multi-pole magnet being a sintered element obtained by sintering a green compact of a kind in which a powdery mixture of the powdery magnetic material and a powdery non-magnetic material is press-molded, and
said green compact having a porosity within the range of 5 to 30 vol. %.

2. The magnetic encoder as claimed in claim 1, wherein the powdery magnetic material is mixed in an amount within the range of 30 to 80 vol. %.

3. The magnetic encoder as claimed in claim 1, wherein the powdery magnetic material is a powder of ferrite.

4. The magnetic encoder as claimed in claim 3, wherein the powdery magnetic material is a wet powder of anisotropic ferrite core.

5. The magnetic encoder as claimed in claim 1, wherein the powdery magnetic material includes samarium compound.

6. The magnetic encoder as claimed in claim 1, wherein the powdery magnetic material includes neodymium compound.

7. The magnetic encoder as claimed in claim 1, wherein the powdery non-magnetic metallic material is a powder of stainless steel.

8. The magnetic encoder as claimed in claim 1, wherein the powdery non-magnetic metallic material is a powder of tin.

9. The magnetic encoder as claimed in claim 1, wherein the powdery mixture includes two or more powdery magnetic materials or two or more powdery non-magnetic metallic materials.

10. A wheel support bearing assembly provided with a magnetic encoder as defined in claim 1.

11. The wheel support bearing assembly as claimed in claim 10, wherein the wheel support bearing assembly supports a wheel for rotation relative to a vehicle body, said wheel support bearing assembly comprising:
an outer member having an inner peripheral surface formed with a plurality of first raceways;
an inner member having a corresponding number of second raceways defined therein in alignment with the first raceways in the outer member;
rows of rolling elements rollingly received in part within the first raceways and in part within the second raceways,
wherein said wheel bearing assembly comprises:
a sealing unit to seal an annular bearing space delimited between the outer member and the inner member, said sealing unit including a first sealing plate of a generally L-sectioned configuration mounted on one of the outer and inner members which serves as a rotatable member, and a second sealing plate of a generally L-sectioned configuration mounted on the other of the outer and inner members which serves as a stationary member, and positioned in face-to-face relation with the first sealing plate, said first sealing plate defining the core metal of the magnetic encoder and having a cylindrical axial wall and a radial upright wall; and
an elastic sealing member including a side sealing lip and at least one radial sealing lip, said elastic sealing member being secured to the second sealing plate with the side sealing lip slidingly engaging the radial upright wall of the first sealing plate and with the at least one radial sealing lip slidingly engaging the cylindrical axial wall;
wherein the multi-pole magnet is mounted on the radial upright wall of the first sealing plate.

* * * * *